United States Patent [19]

Mitchell

[11] 3,888,128
[45] June 10, 1975

[54] WHEEL BALANCING SYSTEM
[75] Inventor: Wallace F. Mitchell, Libertyville, Ill.
[73] Assignee: Ammco Tools, Inc., North Chicago, Ill.
[22] Filed: May 31, 1974
[21] Appl. No.: 475,105

[52] U.S. Cl. .................. 73/484; 73/487; 144/288 A
[51] Int. Cl. ........................................... G01m 1/12
[58] Field of Search ............... 73/480, 482–487; 144/288 A; 157/1.11, 1.24

[56] References Cited
UNITED STATES PATENTS
2,764,194  9/1956  Schultz ........................ 144/288 A
3,349,626  10/1967  Palacios ........................... 73/487

Primary Examiner—James J. Gill
Attorney, Agent, or Firm—Edmond T. Patnaude

[57] ABSTRACT

Apparatus for balancing the wheels of automotive vehicles utilizes a set of slotted, relatively rotatable plates for adjusting and holding a plurality of wheel support members in symmetrically disposed positions around the vertical spindle of a bubble type wheel balancer.

10 Claims, 6 Drawing Figures

PATENTED JUN 10 1975　　3,888,128

WHEEL BALANCING SYSTEM

The present invention relates in general to the art of wheel balancing, and it relates more particularly to new and improved means for mounting wheels to be balanced on a bubble balancer.

BACKGROUND OF THE INVENTION

The system and apparatus of this invention constitute an improvement over the wheel support system disclosed in my earlier issued U.S. Pat. No. 3,742,766. The system there disclosed employs a plurality of wheel support pins which slidably rest on a planar surface extending perpendicularly from the spindle of a bubble balancer. The upper ends of the pins are adapted to be received in the bolt holes of a wheel to be balanced to thereby support the wheel, and a centering cone slidable on the spindle over the wheel has a frustoconical surface which fits into the center hole of the wheel to accurately align the axis of the wheel with the axis of the spindle. While the balancer disclosed in that patent enables accurate wheel balancing, it has the disadvantage that the wheel support pins must be initially positioned one by one so that they are approximately aligned with the bolt holes of the wheel when it is placed on the balancer. Moreover, the pins can be accidentally knocked over as a wheel is being placed thereon. Nevertheless, the basic principal of supporting the wheel on pins slidable on a planar support surface and centering the wheel on the balancer by means of a centering cone enables the accurate balancing of most automotive vehicle wheels in use at the present time.

It would be desirable to utilize the basic concept of this proven wheel balancing system in a bubble type balancer including means for alleviating the heretofore mentioned disadvantages. Such a balancer should have universal application for use with all conventional automotive vehicle wheels, it should be sufficiently rugged to be used under generally adverse conditions in vehicle repair shops, and it should be useable by relatively untrained personnel. In regard to the latter requirement it should incorporate means for easily and quickly positioning the wheel support pins at approximately the correct positions. Also, it should incorporate means for preventing the pins from being accidentally tipped over.

SUMMARY OF THE INVENTION

Briefly, in accordance with the teachings of the present invention there is provided a substantially universal wheel balancing system which employs a plurality of pins slidably supported on an annular, horizontal surface of the spindle or tower and a centering cone slidable on the spindle for centering the wheel thereon. A pair of locating plates are provided with rectilinear slots and the plates are mounted in face to face overlying relationship such that the slots in one plate cross over the slots in the other plate. A plurality of wheel support pin assemblies each include a wheel support pin and a separate base extending through the overlying portions of the slots whereby relative rotation of the plates about the spindle causes the base and pin assemblies to move simultaneously in respective radial directions. A plurality of sets of pin locator plates and interconnected bases for accomodating wheels having different numbers of bolt holes are provided as part of the system.

DETAILED DESCRIPTION OF THE INVENTION

Figure 1:
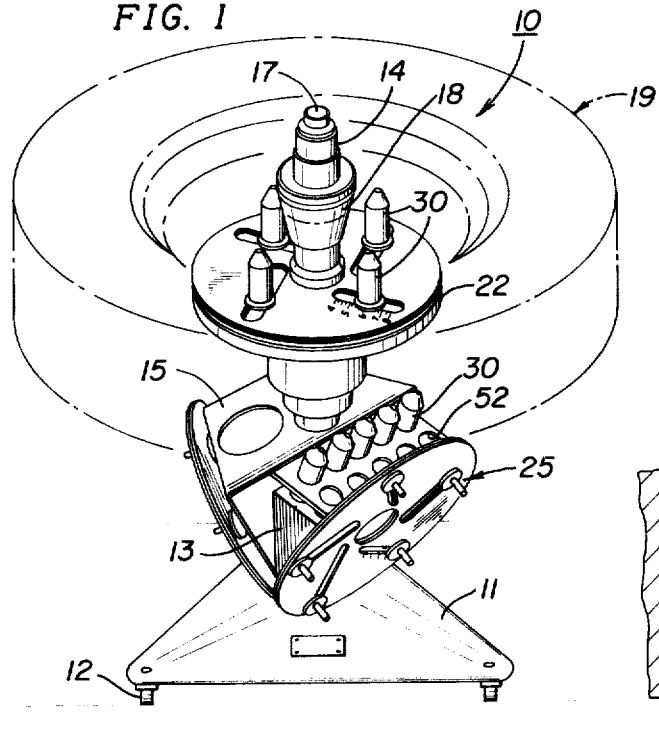
FIG. 1 is a perspective view of a wheel balancer embodying the present invention.

Referring to FIG. 1, there is shown a complete wheel balancing system 10 for balancing the wheels of automotive vehicles. The system 10 comprises a base 11 mounted on a plurality of casters 12 and to which a support post 13 is fixedly secured. A spindle or tower 14 is mounted for universal pivotal movement on the post 13. A caddy rack 15 is mounted to the post 13 below the spindle and is adapted to hold various parts of the system as more fully described hereinafter. A 360° spirit level 17 is mounted on the top end of the spindle 14 to indicate the angular deviation of the spindle axis from the vertical. A centering cone 18 is slidable on the spindle over the wheel 19 to be balanced (shown in phantom) and is used to position the wheel coaxially with the spindle 14.

Figure 2:
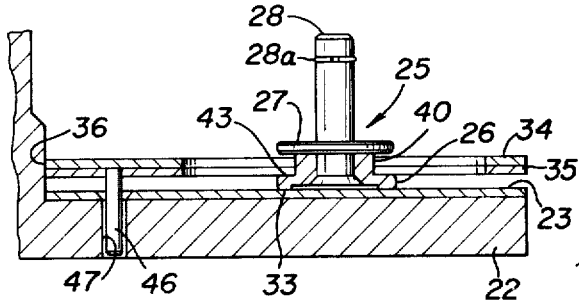
FIG. 2 is a sectioned elevation of the wheel balancer of FIG. 1.
Figure 2:
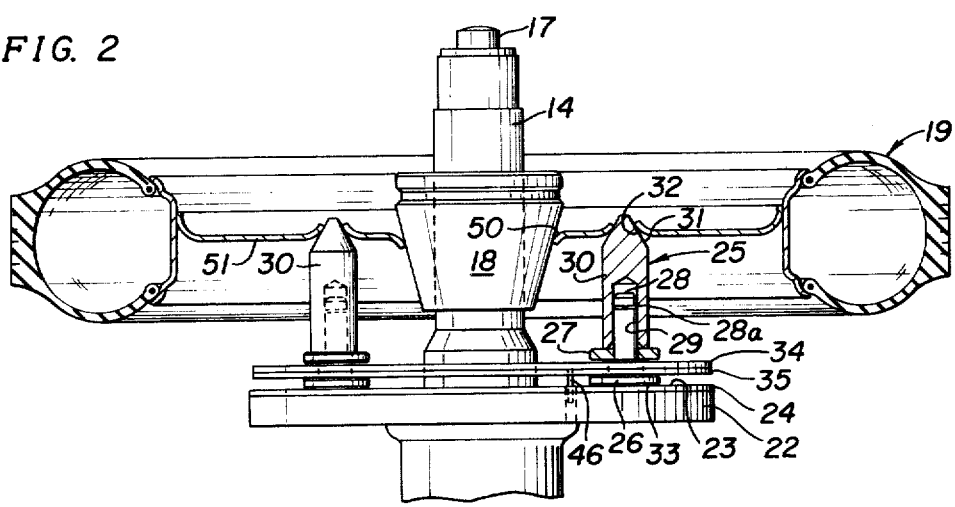

With particular reference to FIG. 2, a circular platform 22 is fixed to the spindle 14 so that the planar upper surface 23 lies perpendicular to the longitudinal axis of the spindle 14. The surface 23 is preferably a smooth surface provided on an annular steel plate 24 resting on the platform 22 and welded thereto. A plurality of wheel support base assemblies 25 each includes a base or pedestal portion 26 and a locator portion 27 attached thereto and including a central post 28. The lower end of the post extends into the central bore in the base 26 and is fixed thereto as by staking. A plurality of wheel support pins 30 are removably mounted to the base assemblies with the posts 28 extending into axial recesses 29 in the bottom of the pins. The recesses 29 are outwardly flared at the bottom as indicated at 29a. The base members 26 have a planar lower surface 33 which rests on the platform surface 23 to maintain the pins 30 in parallel relationship with the longitudinal axis of the spindle. A frustoconical seat 31 is provided at the top of each pin 30 for receipt in one of the mounting holes 32 of the wheel 19. A split spring ring 28a is mounted in an annular groove near the top of each post 28 and is compressed into the groove as a pin 30 is placed on the post 28. The spring 28a thus holds the associated pin 30 in place on the post 28 when the post is inverted.

In order to facilitate positioning of the support assemblies 25 so that they are in alignment with the mounting holes 32 when the wheel is placed over the spindle and onto the seats 31, a set of slotted locating plates 34 and 35 are centered on the spindle 14 and rest on the flanges of the base portions 26 of the wheel support assemblies. The locators 27 are secured as by staking to the bases 26 with the plates 34 and 35 trapped between the flanges thereof. The specing between the flanges is greater than the combined thicknesses of the plates 34 and 35 whereby the weight of the wheel is not exerted on the plates to prevent relative rotation thereof.

Figure 3:
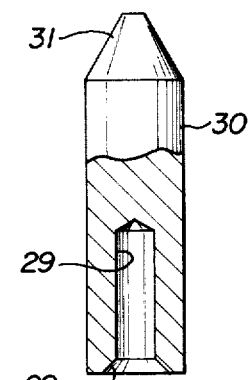
FIG. 3 is an exploded sectional view of a portion of the wheel balancer of FIG. 1.
Figure 4:
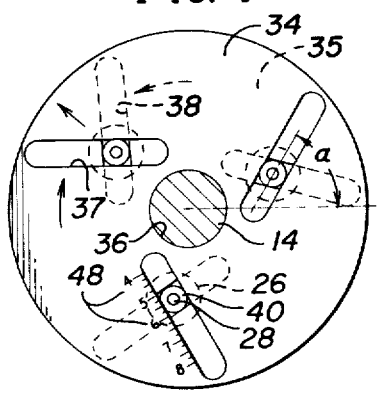
FIG. 4 is a plan view of a set of locator plates and pin bases in place.
Figure 5:
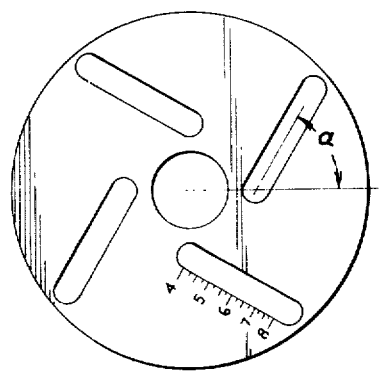
FIGS. 5 and 6 are plan views of two other locator plates useable with the balancer of FIG. 1.
Figure 6:
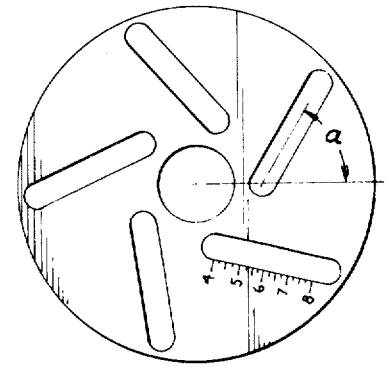

As best shown in FIGS. 3 and 4, the plates 34 and 35 are annular having a central circular opening 36 which slidably fits over the cylindrical spindle 14. The plates 34 and 35 each have a number of rectilinear slots 37 and 38 respectively equaling the number of mounting holes 32 in the wheel 19 to be balanced. Most automotive vehicle wheels have either three, four or five such mounting holes wherefore three sets of locating plates 34 and 35 respectively having three, four and five slots are provided in the system 10. The four and five slotted plates are shown in FIGS. 5 and 6 respectively. The slots 37 and 38 have a width slightly greater than the upstanding cylindrical portions 40 of the base portions of the wheel support assemblies 25 and the portions 40 extend through those portions of the slots which overlie one another as shown in FIG. 4. An annular surface 43 on each base lies parallel to the bottom surface thereof and has a diameter exceeding the widths of the slots 37 and 38 whereby the lower plate 35 rests on and is supported by the base portions of the wheel support assemblies in parallel relationship with the surface 23, and the upper plate 34 rests directly on the lower plate 33. The annular flange on each locator 27 rests on the associated pedestal portion 26 and is spaced a short distance above the upper plate 34. The pins 30 thus rest on the locators 27 whereby the weight of the wheel does not interfere with adjustment of the plates 34 and 35.

The plates 34 and 35 are substantially identical with one plate in each set inverted relative to the other so that the slots therein cross one another. The slots 37 and 38 are rectilinear and are tangential to a circle concentric with the axis of the hole 36. As shown in FIG. 5, these slots are at an angle relative to the diameter of the plate extending through the center of the bolt circle at the inner end of the slot. The angle $a$ is equal to about 60° for plates used with bolt circles of 3 ½ to 8 inches and in the preferred embodiment of the invention is 59° 40' for all three sets of plates. As the plates 34 and 35 are rotated relative to one another the pin assemblies are moved simultaneously in a radial direction. Angular movement of the pin assemblies relative to the balancer is prevented by interlocking one of the plates with the spindle. In the illustrated embodiment of this invention the lower plate 35 is locked in place by means of a pin 46 which depends therefrom into a hole 47 in the platform 22. For ease of use, a set of graduations 48 is provided on the upper surface of the top plate 34 adjacent one of the slots 37 to indicate the distance of the pin assemblies from the axis of the spindle. The spacing between the lower plate 35 and the platform surface 23 permits the operator to rotate the top plate with his thumb and first finger.

OPERATION

In order to balance a given wheel 19, a set of plates 34 and 35 and associated pedestal assemblies is selected which has the number of slots and pedestal assemblies corresponding to the number of mounting holes 32 in the rim of the wheel 19. A plurality of pins 30 of equal height are then placed on the posts 28 and the lower plate is rotated to align the locating pin 46 with the hole 47. The radial positions of the pin assemblies are then set to those of the mounting holes 32 by simply rotating the top plate 34. This can be readily accomplished by pressing the plate and pin assemblies against the wheel to be balanced while the wheel is lying on the floor or is in an upright position. The plate and pin assemblies are then placed over the spindle onto the platform surface 33, and the wheel is then placed over the spindle such that the tapered seats 31 extend into the mounting holes 32 to support the wheel 19. The centering cone 18 is then inserted into the accurately centered hole 50 in the wheel rim to duplicate the mounting of the wheel on the vehicle by centering it on the spindle 14 in perpendicular relationship therewith.

Preferably, one or more additional sets of five pins 30 are provided, the lengths of the pins varying from set to set to accommodate differently shaped wheels, such, for example, as sculptured wheels. The illustrated system 10 employs two sets of pins with the unused pins being held in recesses 52 in the caddy rack 15 as shown in FIG. 1. The pins in one set each have a length of about 2 1/4 inches and the pins in the other set each have a length of about three and one quarter inches. These pins can accommodate most present day automotive vehicle wheels. However, an annular cup-shaped member (not shown) of the general shape of that shown in my copending application "Wheel Balancer Mount" filed on the same day as this application is incorporated in the system 10 for use with the few wheel designs with which the pins 30 cannot be used.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

I claim:

1. In combination with a wheel balancing device of the type including a base, a vertical spindle pivotably balanced on said base, means indicating the angular relationship of said spindle to the vertical, and means for mounting a wheel to said spindle, the improvement being in said last named means and the improvement comprising a support member mounted to said spindle and having a planar upper surface surrounding said spindle and lying perpendicular to the longitudinal axis thereof, a plurality of upstanding wheel supports resting on said planar surface, and first and second locating plates disposed in mutually parallel relationship and each having a plurality of symmetrically disposed slots through which said supports respectively and slidably extend, said slots being rectilinear and extending tangentially to a circle concentric with said longitudinal axis of said spindle, the slots in said first plate being the mirror image of the slots in said second plate with the slots in said first plate overlying the slots in said second plate, whereby relative rotation of said plates varies the radial positions of said wheel supports relative to said spindle without disturbing the symmetry of said locating plates and thus the balance of said spindle.

2. The apparatus according to claim 1 wherein said plates are annular.

3. The apparatus according to claim 2 wherein each of said wheel supports comprises a pedestal portion supporting the lower one of said plates.

4. The apparatus according to claim 2 comprising means for locking one of said plates against rotation relative to said support surface.

5. The apparatus according to claim 2 wherein said plates are in face to face abutting relationships.

6. The apparatus according to claim 1 wherein each of said wheel supports comprises
- a base portion having an upstanding cylindrical portion extending through one of the slots in each of said plates, and
- an upper part removably mounted to said base portion above said plates and having an upper seating surface positionable in one of the bolt holes in the wheel to be supported thereby on said wheel balancing device.

7. The apparatus according to claim 6 wherein said plates
- are respectively provided with central holes slidably and removeably positioned over said spindle with said spindle extending through said holes, and
- the base portions of said wheel supports provide the sole support for said plates.

8. The apparatus according to claim 7 wherein is provided
- means depending from the lower one of said plates into interengaging relationship with said spindle to prevent rotation of said lower one of said plates on said spindle.

9. The apparatus according to claim 7 wherein
- said base portions hold the lower one of said plates in substantial spaced apart relationship with respect to said planar support surface to facilitate manual rotation of the upper plate relative to the lower plate.

10. The apparatus according to claim 9 wherein
- said base portions each include an upstanding post,
- said upper parts are each provided with a downwardly opening recess respectively receiving said posts, and
- detent means for holding said upper parts on the associated posts.

* * * * *